US006611639B2

(12) United States Patent
Leclerc et al.

(10) Patent No.: US 6,611,639 B2
(45) Date of Patent: Aug. 26, 2003

(54) OPTICAL MODULE FOR MULTI-CHANNEL WAVELENGTH MULTIPLEXING

(75) Inventors: Olivier Leclerc, Saint Geneviève des Bois (FR); Patrick Brindel, Longpont S/Orge (FR)

(73) Assignee: Alcatel, Paris (FR)

( * ) Notice: Subject to any disclaimer, the term of this patent is extended or adjusted under 35 U.S.C. 154(b) by 30 days.

(21) Appl. No.: 10/123,112

(22) Filed: Apr. 17, 2002

(65) Prior Publication Data

US 2002/0168138 A1 Nov. 14, 2002

(30) Foreign Application Priority Data

May 14, 2001 (EP) .............................................. 01440131

(51) Int. Cl.[7] .............................. G02B 6/00; G02B 6/36
(52) U.S. Cl. ......................................... 385/24; 359/161
(58) Field of Search ............................... 385/16–25, 147; 250/205; 359/109, 123, 161, 337.12

(56) References Cited

U.S. PATENT DOCUMENTS

| 5,416,861 | A | * | 5/1995 | Koh et al. | .................. | 359/109 |
| 6,111,673 | A | * | 8/2000 | Chang et al. | ............... | 359/123 |
| 6,173,094 | B1 | * | 1/2001 | Bowerman et al. | ......... | 359/161 |
| 6,333,805 | B1 | * | 12/2001 | Kamata | ...................... | 250/205 |
| 6,433,925 | B1 | * | 8/2002 | Sakano et al. | ......... | 359/337.12 |

FOREIGN PATENT DOCUMENTS

| EP | 0 743 771 A2 | 11/1996 |
| WO | WO 99/66660 A1 | 12/1999 |
| WO | WO 01/19007 A1 | 3/2001 |

OTHER PUBLICATIONS

Dany B et al.: "Transoceanic 4x4 Gbit/s system combining dispersion–managed solition transmission and new 'black-box' in–line optical regeneration" Electronics Letters, IEEE Stevenage, GB, vol. 35, No. 5, Mar. 4, 1999, pp. 418–420, XP006011840.

Leclerc O., et al.: "Simultaneously regenerated 4x40Gbit/s dense WDM transmission over 10,000km using a single 40GHz InP Mach–Zehnder modulator", Electronics Letters, Aug. 31, 2000, vol. 36, No. 18, pp. 1574–1575.

* cited by examiner

Primary Examiner—Akm E. Ullah
(74) Attorney, Agent, or Firm—Sughrue Mion, PLLC

(57) ABSTRACT

An optical module advantageously uses optical conversion fibers not only for a single channel but for sets of channels that are, in a specific way, selected from a multi-channel wave division multiplex (WDM) grid. The sets of channels are defined such that four wave mixing is negligible or has a negligible effect. The optical module has a demultiplexer, a multiplexer, and parallel optical conversion fiber portions that are arranged between the demultiplexer and the multiplexer. Each of the parallel optical conversion fiber portions has a specific dispersion map and transmits a different set of channels of the multi-channel WDM grid. These channels are regularly spaced from each other.

7 Claims, 2 Drawing Sheets

OPTICAL MODULE FOR MULTI-CHANNEL WAVELENGTH MULTIPLEXING

TECHNICAL FIELD

The present invention relates to an optical module for multi-channel wavelength division multiplexing. The optical module includes parallel, optical conversion fiber portions, wherein a respective optical conversion fiber portion is associated with a specific dispersion map. Each optical conversion fiber portion transmits a different set of channels of a multi-channel wavelength division multiplexing grid, wherein the channels are regularly spaced from each other.

The invention is based on priority application EP 01 440 131.9, which is hereby incorporated by reference.

BACKGROUND OF THE INVENTION

The proliferation of a wide range of new services involves rapid growth in the transmission capacity of telecommunications networks. A key issue is the control of the quality of the transmission data along the whole link. Dispersion management (DM) appears to be a very powerful technique for enhancing the quality of wavelength division multiplexing (WDM) transmission systems. The data are transmitted through so-called dispersion-managed pulses or solitons. At higher bit rates (i.e., starting at 40 Gbit/s and above), in-line optical regeneration based on both intensity and phase modulation (IM-PM) is a helpful and powerful tool for enabling error-free transmission over transoceanic distances. Owing to amplitude fluctuations induced by IM, a narrow bandpass optical filter must be added to the synchronous modulation. However, filters have been shown to be of only poor efficiency in stabilizing the energy of a DM soliton.

To overcome this problem, B. Dany et al. proposed in "Transoceanic 4×40 Gbit/s system combining dispersion-managed soliton transmission and new "black-box" in-line optical regeneration", Electron. Lett., 1999, 35, (5), pp.418–420, a local periodic conversion between a DM soliton and a standard nonlinear Schrödinger (NLS) soliton, thus restoring the filter efficiency for stabilizing amplitude fluctuations. This procedure was tested for data transmission via a single channel.

In "Simultaneously regenerated 4×40 Gbit/s dense WDM transmission over 10,000 km using a single 40 GHz InP Mach-Zehnder modulator", Electron. Lett., 2000, 36, (18), pp.1574–1575, by O. Leclerc et al., a generalization of the above-mentioned procedure for four channels is discussed. A simultaneous optical regeneration (in-line) of the four channels is obtained in a reliable, polarization-insensitive and wavelength-independent Mach-Zehnder packaged modulator. Prior to being optically regenerated, the channels are spectrally demultiplexed. The optical regeneration scheme includes an amplification stage that provides a near NLS soliton average power in a conversion fiber. Hence, at the output of the fiber, DM solitons from each WDM channel are converted into NLS solitons and then spectrally filtered through optical filters having optimized bandwidths. All four WDM channels are then recombined through a multiplexer and simultaneously input in the packaged Mach-Zehnder modulator. Through this approach, all channels are demultiplexed and one fiber per channel is used. Consequently, one dedicated amplifier per channel is needed.

Problems arise when this procedure is applied to dense WDM technology, which is nowadays based on even more than 32 channels. Indeed, one conversion fiber must be provided for each existing channel. And since a dedicated amplifier per channel is needed, this solution is costly. Also, an optimization of the volume when packaging the whole system will be almost impossible.

SUMMARY OF THE INVENTION

It is an object of the present invention to reduce the number of conversion fibers and optical amplifiers so as to utilize the above-mentioned procedure when dense WDM technology is involved.

This and other objects are attained by an optical module for multi-channel wavelength division multiplexing. The optical module includes parallel, optical conversion fiber portions, wherein a respective optical conversion fiber portion is associated with a specific dispersion map. Each optical conversion fiber portion transmits a different set of channels of a multi-channel wavelength division multiplexing grid, wherein the channels are regularly spaced from each other.

The present invention is based on the advantageous use of optical conversion fibers not only for a single channel but for sets of channels that are selected, in a precise way, from the used multi-channel WDM grid. The sets of channels are defined such that four wave mixing is negligible or has a negligible effect.

Further advantageous features of the invention are defined in the dependent claims and will become apparent from the following description and the drawings.

BRIEF DESCRIPTION OF THE DRAWINGS

Exemplary embodiments of the invention will now be explained in more detail with reference to the accompanying drawings, in which.

DETAILED DESCRIPTION OF THE PREFERRED EMBODIMENTS

Figure 1:
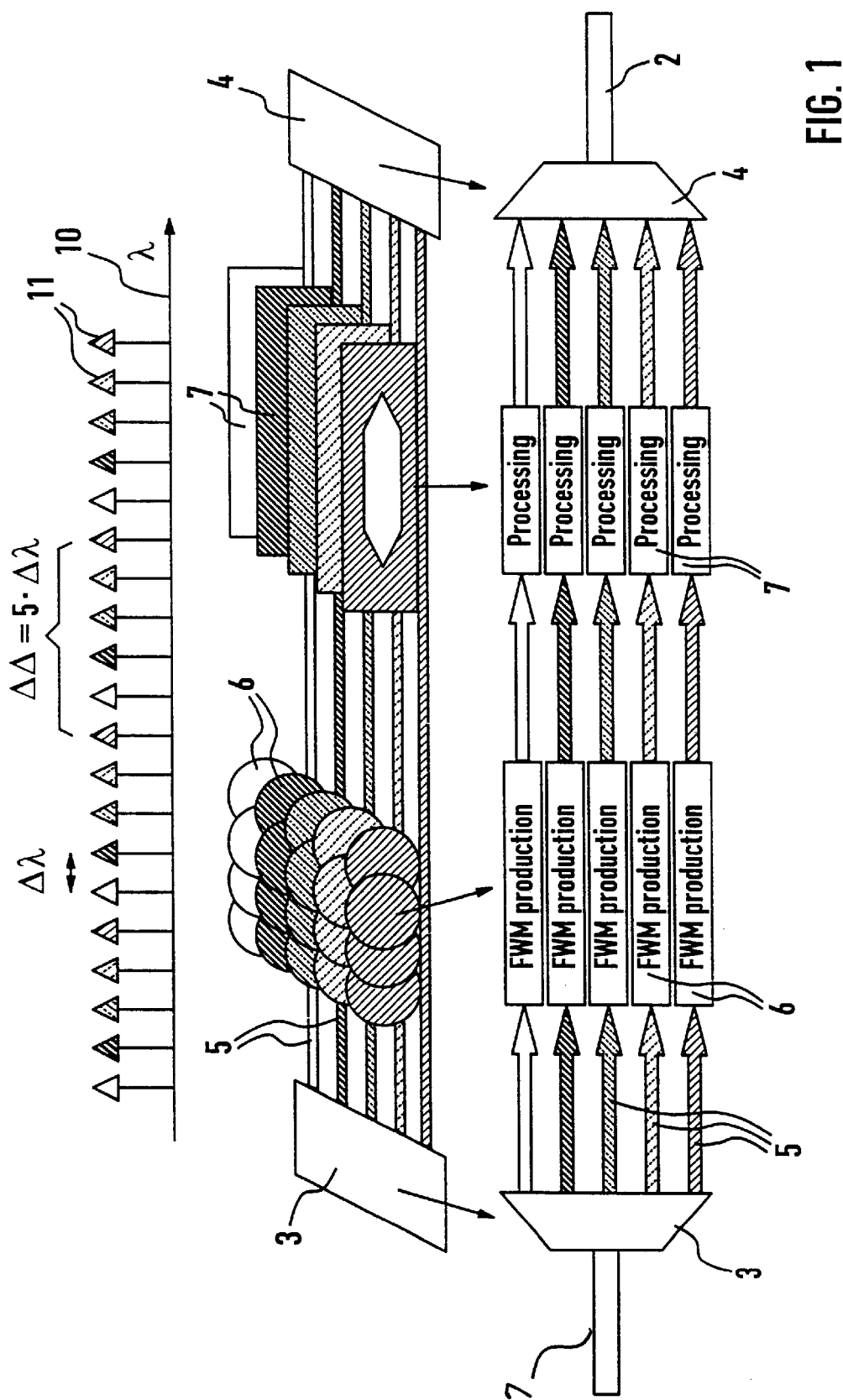
FIG. 1 is a schematic view of an optical module for sets of WDM channels that are spaced from each other by large wavelength intervals.

FIG. 1 shows a schematic view of an exemplary embodiment of the optical module according to the invention. Data signals carried by different optical channels of a multi-channel wavelength division multiplex grid are transmitted to a demultiplexer DMUX 3 via an input optical fiber 1 of the optical module. The data signals leave the optical module via an output optical fiber 2 after passing through a multiplexer MUX 4.

Parallel, different portions of optical fibers 5 are arranged between the DMUX 3 and the MUX 4, wherein each portion of the optical fibers 5 is provided for a different set of channels. The selection of the channels for each set will be described below. The portions of the optical fibers 5 consist of conversion fibers 6 that have a specific dispersion map. The set of channels is converted into NLS solitons via a near nonlinear Schrödinger (NLS) soliton average power. These NLS solitons are transmitted through in-line processing means 7, e.g., a filter such as a Fabry-Perot filter or a regenerator (1R, 2R or even 3R for WDM reshaping, reamplification and retiming) before being recombined by the MUX 4

The selection of the channels for each set from the used multi-channel (dense) wavelength division multiplex (DWDM) grid is performed in such a way that four wave mixing (FWM) products occurring in the respective conversion fiber 6 will be negligible. FIG. 1 shows an example of such a selection from the wavelength spectrum 10, which displays channels 11 of the used DWDM grid. In this case, the grid includes a number of equidistant channels that are separated by an interval $\Delta\lambda$. Every fifth channel of the DWDM grid can be combined together so as to form a set of channels that is intended or provided for a specific conversion fiber 6. The interval $\Delta\Delta$ between each non-adjacent channel of a specific set (here separated by $5\times\Delta\lambda$) must be big enough so that FWM products occurring in the conversion fiber 6 will be negligible. Indeed, the FWM shall not be such that it overlaps with a further channel of the same set. Nevertheless, if necessary, the MUX 4 can be judiciously chosen to act as an optically selective multiplexer. Said optically selective multiplexer will then be implemented to remove also FWM products possibly generated by construction due to juxtaposition of different channels (a specific set) in a single optical fiber 5.

The advantage of an optical module according to the invention is obvious by using the same portion of conversion fiber 6 for several channels (a specific set). Such optical module even allows FWM effects to appear but in a controlled way. Indeed, due to the judicious choice of the channels for each set, the FWM products when ocurring, will appear on the wavelength spectrum 10 at a value where no channel was affected to this set. It is of course of importance to filter out these FWM products before all the channels of the used DWDM grid are combined together and leave the optical module via the output 2. This filtering may be preformed by the in-line processing means 7 or even by the MUX 4 itself.

The choice of the interval $\Delta\Delta$ between each selected channel for a specific set can be different than $5\times\Delta\lambda$ and does not even have to be constant over the whole DWDM grid. Rather, the choice of the interval $\Delta\Delta$ depends on the actual parameters of the optical module (physical properties of the conversion fibers and/or number of used parallel conversion fibers 6) and on the chosen DWDM grid.

Figure 2:
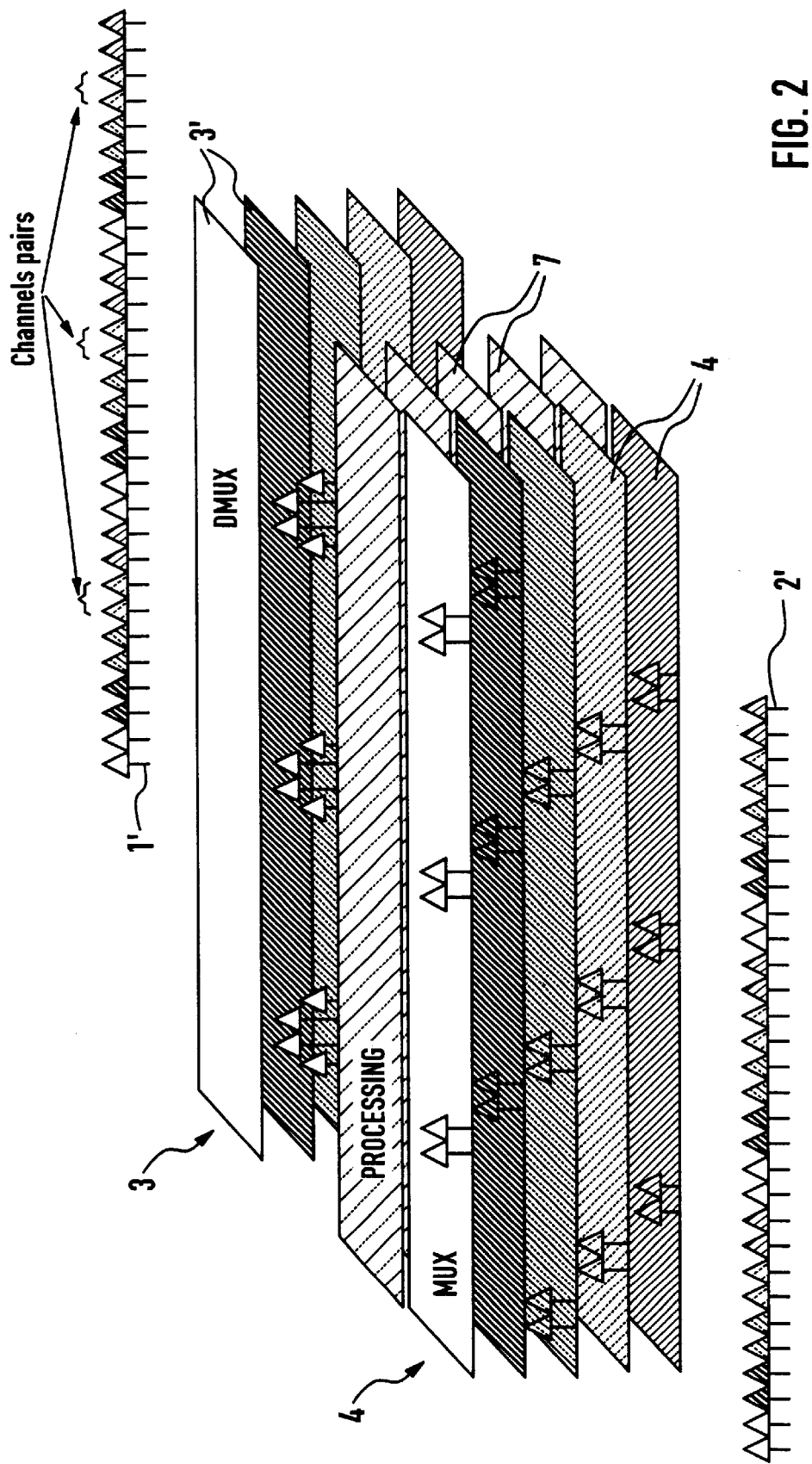
FIG. 2 is a schematic view of an optical module for sets of adjacent channel pairs.

FIG. 2 shows a schematic view of an exemplary embodiment of the optical module according to the invention, which is similar to the one shown in FIG. 1. The sets of channels, which are intended for different parallel portions of the optical fibers 5, are composed of pairs of adjacent channels that are separated by a certain interval in the used DWDM grid 1'. Again, this interval between each pair does not have to be constant over the whole DWDM grid 1'. FIG. 2 shows different stages 3' of the DMUX 3, in which all the channels of the DWDM are demultiplexed and directed to the different parallel portions of optical fibers 5. Each of these different parallel portions of the optical fibers 5 relate to a specific conversion fiber 6 and to the in-line processing means 7 (such as a filter or regenerator).

The FWM products appearing after the NLS soliton conversion (in this case, between each selected pair of channels) must be such that they do not interfere with another pair of channels in the same set. This principle may be advantageously applied to sets of adjacent triple channels or quadruple channels, as long as the FWM products are controllable.

The FWM products are removed in each sub-multiplex by the MUX 4 through proper recombination so as to generate a whole DWDM 2' at the output of the optical module.

With an optical module according to the present invention, it is possible to use a single conversion fiber for several channels. Also, it is possible to benefit from the dispersive properties of the conversion fibers 6 to self-synchronize the set of channels in order to use a synchronous modulation stage. It may also be possible to include a wavelength selective optical adjustable delay line, e.g. in a similar fashion as discussed in prior art from O. Leclerc et al. If needed, the processing means 7 are used for several channels, which allows for optimization of the setup of such an optical module, in particular in view of the whole volume it will take. This is of high importance for submarine networks.

What is claimed is:

1. An optical module for multi-channel wavelength division multiplexing, comprising:
    a demultiplexer;
    a multiplexer; and
    a plurality of parallel optical conversion fiber portions arranged between the demultiplexer and the multiplexer;
    wherein each of the plurality of parallel optical conversion fiber portions has a specific dispersion map;
    wherein each of the plurality of parallel optical conversion fiber portions is configured to transmit a set of channels of a multi-channel wavelength division multiplex grid;
    wherein the respective sets of channels transmitted by the plurality of parallel optical conversion fiber portions differ from each other; and
    wherein the channels of each one of the respective sets of channels are regularly spaced from each other.

2. The optical module of claim 1, wherein the respective sets of channels comprise non-adjacent channels of the multi-channel wavelength division multiplex grid.

3. The optical module of claim 1, wherein the respective sets of channels comprise pairs of adjacent channels of the multi-channel wavelength division multiplex grid that are regularly spaced from each other.

4. The optical module of claim 1,
    wherein the demultiplexer comprises an output;
    wherein the multiplexer comprises an input; and
    wherein the plurality of parallel optical conversion fiber portions are connected to the output of the demultiplexer and to the input of the multiplexer.

5. The optical module of claim 1, further comprising a plurality of in-line processing means for the respective sets of channels, to which respective ones of the plurality of parallel optical conversion fiber portions are connected.

6. The optical module of claim 5, wherein the plurality of in-line processing means comprise at least one of detectors and regenerators.

7. The optical module of claim 1, wherein the plurality of parallel optical conversion fiber portions are configured to synchronize the channels.

* * * * *